INVENTOR:
Sven G. Nordstrand,
His Attorney.

3,064,683
Patented Nov. 20, 1962

United States Patent Office

1

3,064,683
FLUID CONTROL VALVES
Sven G. Nordstrand, Vallentuna, Sweden, assignor to Claudo Aktiebolag, Stockholm, Sweden, a corporation of Sweden
Original application June 22, 1956, Ser. No. 593,170, now Patent No. 2,928,421, dated Mar. 15, 1960. Divided and this application Jan. 15, 1960, Ser. No. 2,786
Claims priority, application Denmark June 25, 1955
5 Claims. (Cl. 137—625.2)

This invention relates to fluid control valves of the type comprising a resilient tube provided in a valve housing having inlet and outlet openings so as to leave a space between the resilient tube and the surrounding valve housing to form a passage between the openings. Rotatable valve operating means are provided inside the tube for urging the latter into fluid tight connection with the surrounding wall of the valve housing to close the passage between said openings.

A valve of this type is for instance described in the U.S. patent specification 2,812,154.

Reference is made to my co-pending application Ser. No. 593,170 filed on June 22, 1956, now Patent No. 2,928,421 dated March 15, 1960 of which this application is a division.

The main object of the invention is to provide means in a valve of the type described whereby the passage of the valve housing is automatically bled to the atmosphere or a bleed conduit when the valve operating means are rotated into a given position, for instance closed position.

Another object of the invention is to provide a closure part coupled with the rotatable valve operating means so that when the latter are rotated the closure part pressing the resilient tube sealingly against a small hole leading outwards from the valve passage through the housing is moved and releases its pressing action when the operating means have been rotated into a given position.

The provision of such a bleeding device is desirable with compressed air gas systems which are frequently dismantled in order to release pressure in the pipes. The small hole can also be connected to a system for indicating the position of the valve operating means. There is, however, no intention to limit the invention to these two applications.

Two embodiments of the invention are now described for example only with reference to the accompanying drawing.

Figure 1:
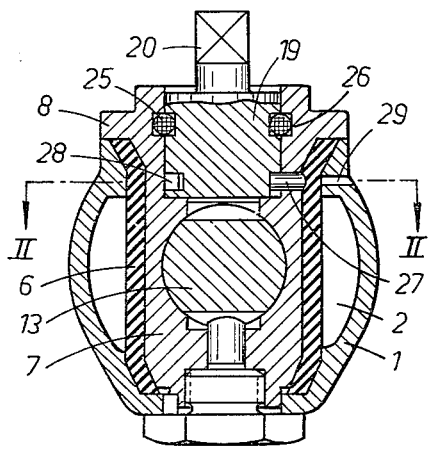
FIGURE 1 is an axial sectional view of a valve according to the invention.
Figure 2:
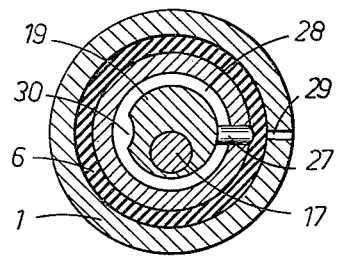
FIGURE 2 is a cross section according to the line II—II in FIGURE 1.

FIGURES 1 and 2 show a valve of the type described. The housing 1 is an approximately spherical shell and surrounds a tube 6 of resilient material, which passes through the housing at right angles to a pair of diametrically opposite outlet and inlet openings (not shown). A space 2 between the housing 1 and the tube 6 forms the passage through the valve. A cylindrical inset 7 having a flange 8 at one end extends through the tube 6 with its flange 8 resting against a rim at the top of the valve housing. The inset 7 is secured at the bottom by a screw.

The inset 7 supports a central slide 13 movable at right angles to its axis to urge the tube 6 into fluidtight engagement with a seating surrounding the inlet opening

2 of the valve. The slide 13 can be moved to and fro by a crank 17, 19, which comprises a cylindrical portion 19 of a large diameter rotatably mounted in the upper portion of the inset 7. A rubber sealing ring 25 of circular cross section is located in a groove 26 in the portion 19 and a groove in the bore of the inset 7. The portion 19 has a square projection 20 to which a handle can be fixed.

According to the invention an auxiliary closure part in the form of a pin 27 is movably mounted in a radial bore in the inset 7 and is coaxial with a small hole 29 through the wall of the housing 1. The pin 27 has an outer end engaging the inner surface of the tube 6 urging the latter into fluidtight engagement with the hole 29. The inner end of the pin 27 rests in the bottom of a circumferential groove 28 in the enlarged portion 19 of the crank, thereby acting as a locating dowel for the enlarged portion 19 of the crank shaft.

At a given angular position relative to the crank pin 17 the groove 28 is provided with a radial depression 30 (FIGURE 2). When the crank-shaft 19 is turned so that the depression 30 is moved in register with the pin 27 the latter is permitted to move inwards thus releasing the corresponding portion of the tube 6. The pressure in the passage 2 of the valve outside the tube 6 urges the portion of the wall of the tube 6 towards the axis of the crank-shaft 19 and forms a passage between the tube 6 and that portion of the inner wall of the housing surrounding the bore 29.

Preferably the depression 30 has such an angular position that the pin 27 is released only in the closed position of the valve.

Figure 3:
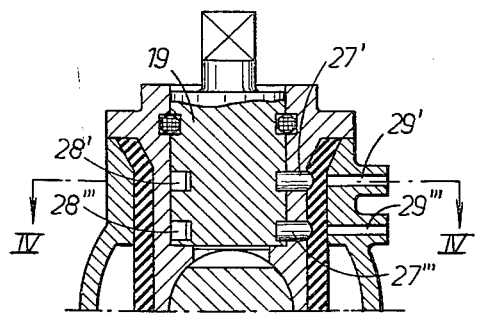
FIGURE 3 is a fragmental sectional view similar to that in FIGURE 1 of another embodiment of the invention.
Figure 4:
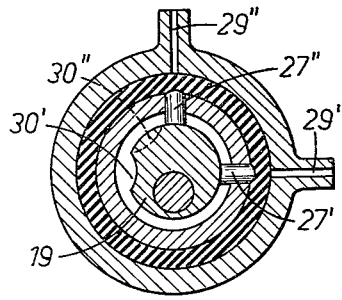
FIGURE 4 is a cross section according to the line IV—IV in FIGURE 3.

FIGURES 3 and 4 show a modified arrangement according to the invention having three pins 27′, 27″, 27‴ mounted in different relative angular positions. The enlarged portion 19 of the crank-shaft is provided with two peripheral grooves 28′, 28‴ one above the other. Two of the pins (27′, 27″) engage the bottom of the upper groove 28′ and are located at right angles to each other. A radial depression 30′ is provided to release the pins 27′, 27″ in two different angular positions of the crank-shaft. The lower pin 27‴ is released in a further different position of the crank-shaft 19 by means of the radial depression 30″ in its associated groove.

I claim:

1. In a valve of the type having a cylindrical hollow body of resilient material fixedly mounted in a housing so that a flow passage is formed around said resilient body between it and the inner wall of the housing and valve operating means for deforming said hollow body to close and open said flow pasage, said housing having a bleeding opening spaced from said passage and operable to intercommunicate with said passage, the provision of auxiliary closure means within said hollow body for urging normally a portion of the peripheral wall of the latter into tight engagement with said opening to block intercommunication and, respectively, cooperating with said valve operating means for being released from its engagement with the wall of the hollow body at a predetermined position of said valve operating means and thereby establishing said inter-communication connecting the flow passage in the valve housing with the ambient atmosphere at said predetermined position of the valve operating means.

2. In a valve, as claimed in claim 1, said predetermined position being the closed position of said valve operating means.

3. In a valve of the type having a cylindrical hollow body of resilient material fixedly mounted in a housing so that a flow passage is formed around said resilient body between it and the inner wall of the housing and rotatable valve operating means for deforming said hollow body to close and open said flow passage, the provision of a radially movable pin within said hollow body for urging the peripheral wall of the latter into tight engagement with an opening through the wall of the housing and cooperating with a cam-shaped portion of said rotatable valve operating means for being released from its engagement with the wall of the hollow body at a predetermined angular position of said valve operating means and thereby connecting the flow passage in the valve housing with the ambient atmosphere at said predetermined position of the valve operating means.

4. In a valve of the type having a cylindrical hollow body of resilient material fixedly mounted in a housing so that a flow passage is formed around said resilient body between it and the inner wall of the housing and valve operating means within said hollow body for deforming it to close and open said flow passage, the provision of at least two movable members within said hollow body each adapted for urging a portion of the peripheral wall of said hollow body into tight engagement with its own opening through the wall of the housing and for cooperation with said valve operating means so that each member will be released from its engagement with the wall of the hollow body at a predetermined position of said valve operating means and thereby connecting the flow passage in the valve housing with the ambient atmosphere at said predetermined positions of the valve operating means.

5. In a valve of the type having a cylindrical hollow body of resilient material fixedly mounted in a housing so that a flow passage is formed around said resilient body between it and the inner wall of the housing and valve operating means for deforming said hollow body to close and open said flow passage, said housing having a bleeding opening operable to intercommunicate with said passage, the provision of auxiliary closure means within said hollow body for normally urging a portion of the peripheral wall of the latter into tight engagement with said bleeding opening to block intercommunication during the flow passage opening movement of said valve operating means and, respectively, cooperating with said valve operating means for being released from its engagement with the wall of said hollow body only in closed position of said flow passage and thereby establishing said intercommunication with said passage.

References Cited in the file of this patent

UNITED STATES PATENTS

| | | |
|---|---|---|
| 1,779,503 | Swindin | Oct. 28, 1930 |
| 2,735,446 | Boyce | Feb. 21, 1956 |
| 2,888,952 | Klaren | June 2, 1959 |
| 2,928,421 | Nordstrand | Mar. 15, 1960 |